United States Patent [19]
Lord, Jr.

[11] Patent Number: 5,076,631
[45] Date of Patent: Dec. 31, 1991

[54] PACKAGE TRAY

[75] Inventor: Ernest A. Lord, Jr., Rochester Hills, Mich.

[73] Assignee: Globe Automotive Industries, Inc., Troy, Mich.

[21] Appl. No.: 653,625

[22] Filed: Feb. 11, 1991

[51] Int. Cl.$^5$ ............................................... B60R 7/02
[52] U.S. Cl. .................................. 296/37.8; 296/39.3; 428/171; 428/218
[58] Field of Search .......................... 296/39.3, 37.16; 428/171, 218, 156

[56] References Cited

U.S. PATENT DOCUMENTS

| | | | |
|---|---|---|---|
| 2,069,413 | 2/1937 | Leadbetter | 296/39.3 |
| 2,113,128 | 4/1939 | Cunnington | 296/39.3 |
| 3,993,345 | 11/1976 | Croup | 296/37.16 |
| 4,670,324 | 6/1987 | Sato et al. | 296/37.8 |

Primary Examiner—Robert R. Song
Attorney, Agent, or Firm—Barnes, Kisselle, Raisch, Choate, Whittemore & Hulbert

[57] ABSTRACT

A package tray adapted to be mounted on the body structure of an automotive vehicle between the upper edge portion of the rear seat back and the rear window thereof. The package tray comprises a relatively rigid, substantially self-supporting panel having a plurality of spaced apart, downwardly projecting button-like pads on the bottom surface engageable with the body structure to preclude objectionable rattling or vibration.

4 Claims, 1 Drawing Sheet

PACKAGE TRAY

This invention relates generally to interior panels for automotive vehicles and more particularly to a package tray having an anti-rattle feature.

BACKGROUND OF THE INVENTION

Package trays usually are mounted on the body structure of an automotive vehicle between the rear seat back and the rear window. Package trays must be sufficiently strong and rigid to support small objects as well as speakers, speaker grills, glove boxes, a third stop light, and the like. However, because they are also somewhat flexible and often not fully supported by the vehicle body structure, they have a tendency to vibrate when the vehicle is in motion and in some instances when it is idling. Moreover, the underlying sheet metal of the vehicle also frequently vibrates particularly when the vehicle is not moving but the engine is running. Rattling frequently occurs when the package tray and/or the underlying vehicle sheet metal vibrates so one strikes the other. Package trays currently in use are not constructed in a manner which effectively eliminates this rattling.

SUMMARY OF THE INVENTION

The package tray of the present invention is in the form of a relatively rigid, substantially self-supporting panel, and is provided with a plurality of spaced apart relatively soft or flexible pads or bumps which are engageable with the body structure of the vehicle to preclude objectionable rattling. Preferably the panel is made of a molded fibrous material in which the pads or bumps are molded integrally with the panel. The panel may be made from a blank placed between the dies of a press or molding tool and molded under heat and pressure. The press dies are contoured to provide a relatively rigid panel of the desired configuration, thickness and density, with integral anti-rattle pads projecting from the panel. The pads, being thicker and less dense than the relatively thin panel, are therefore softer than the panel and hence inhibit rattling when touching the vehicle body structure.

Objects, features and advantages of this invention are to provide a package tray which precludes objectionable rattling, and is rugged, durable, of relatively simple construction and of economical manufacture and assembly.

BRIEF DESCRIPTION OF THE DRAWINGS

These and other objects, features and advantages of the invention will become more apparent as the following description proceeds, especially when considered with the accompanying drawing in which.

DETAILED DESCRIPTION

Figure 1:
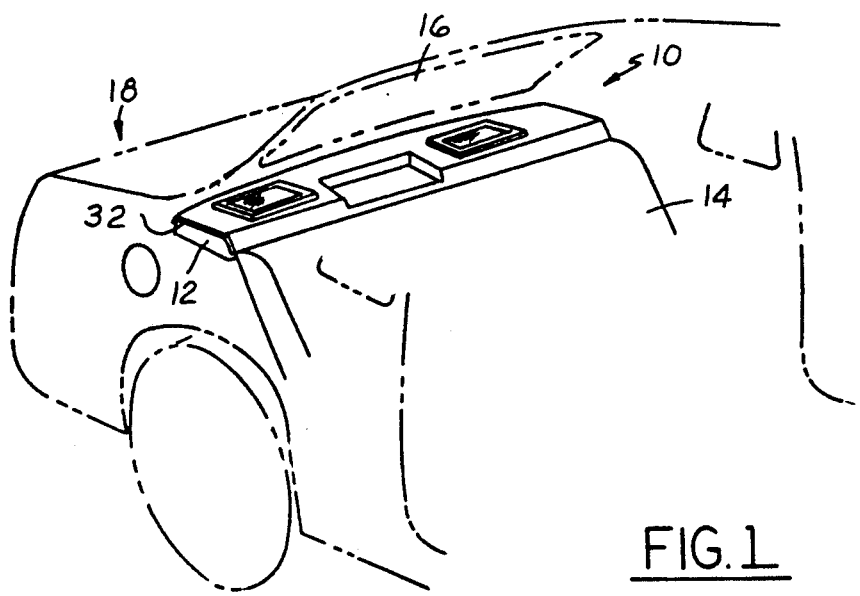
FIG. 1 is a fragmentary perspective view of a package tray embodying the present invention and shown mounted between the rear seat back and rear window of an automotive vehicle.
Figure 2:
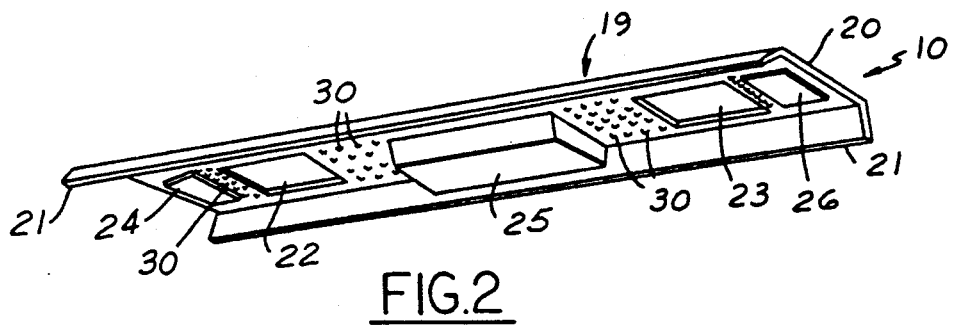
FIG. 2 is an enlarged perspective view of the package tray showing the undersurface thereof.

Referring now more particularly to the drawing, a package tray generally designated 10 is shown mounted on the body structure 12 between the upper edge portion of the rear seat back 14 and the rear window 16 of an automotive vehicle 18.

The package tray 10 may take many different forms and in the present instance comprises an elongated panel 19 of generally channel shape having a base 20 and side flanges 21 extending along the opposite longitudinal edges of the base and flaring downwardly and outwardly therefrom.

Except for the anti-rattle pads or bumps 30 described more fully hereinafter, the panel including its base and flanges is preferably of uniform thickness and may have openings 22 and 23 for speakers and depressed areas providing recesses 24, 25 and 26 for receiving small objects such as glove boxes, a third stop light, and the like.

To prevent objectionable rattling and vibration, a plurality of button-like pads, domes, or bumps 30 are provided on the bottom face 27 of the panel base 20. These pads or bumps 30 are preferably formed integrally with the panel. They may be provided in several groupings and preferably, although not necessarily, are located in areas between the openings and recesses 22-26. The bumps or pads 30 in each grouping are preferably arranged in a plurality of equally laterally spaced apart parallel rows 31 with the pads in each row spaced apart equal distances from one another. Preferably the pads in each row are aligned with pads in the other rows to provide lines of pads at right angles to the rows 31.

Figure 3:
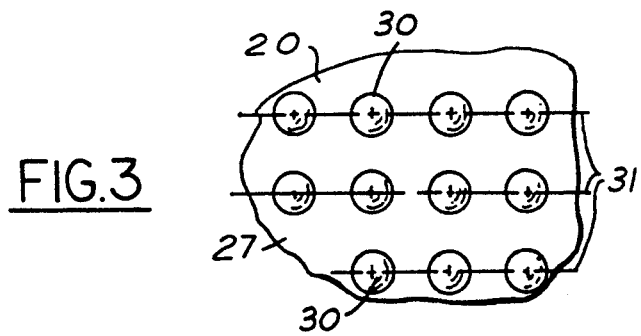
FIG. 3 is a fragmentary view of a portion of the undersurface of the package tray showing some of the bumps or supporting pads.
Figure 4:
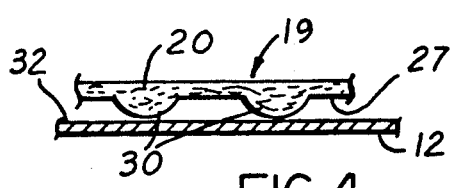
FIG. 4 is a sectional view taken on the line 4—4 in FIG. 1 showing a portion of the tray received on an underlying portion of a vehicle body.

The pads 30 may be of any desired configuration but preferably are in the form of domes or portions of spheres so as to be part spherical as best shown in FIGS. 3 and 4. The pads 30 all preferably project the same distance from the bottom surface 27 of the base.

When installed in the vehicle as shown, these bumps or pads 30 preferably project into close proximity with the top surface 32 of the underlying body structure 12 and preferably actually lightly touch or bear on the top surface of the body structure. Accordingly, the pads 30 dispose the bottom face 27 of the panel in spaced relation above and free of contact with the underlying body structure as shown in FIG. 4.

Preferably the package tray panel is made of a cotton and synthetic fiber blend, with a phenolic resin binder. Thick blankets or mats of this material are made and cut into blanks. A blank is placed between the two halves or dies of a molding tool or press, and formed to the desired configuration under sufficient heat and pressure and for a sufficient period of time to cure the resin binder and produce a package tray which is relatively rigid and substantially self-supporting although still somewhat flexible.

Figure 5:
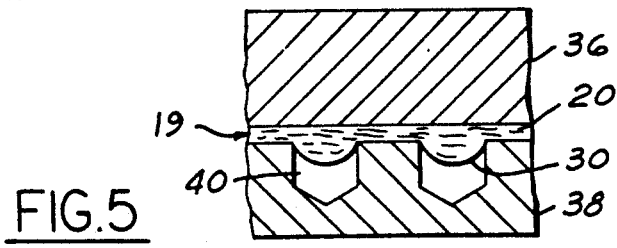
FIG. 5 is a fragmentary sectional view of dies forming the package tray.

As shown in FIG. 5, the panel 19 can be formed by a pair of heated upper and lower die halves 36 and 38 received in a press (not shown). The heated dies compress the blank of material to a relatively thin section and cure the resin. The shape and form of the anti-rattle pads or bumps is formed by relieved areas or holes 40 in the lower die 38 so that they are molded integrally with the panel 19. Preferably, the holes 40 provide sufficient relief so that the outer surface of each pad 30 does not contact the lower die surface during molding.

Because the pads or bumps are formed into the panel during molding, they are not compressed as much as the remainder of the panel proper and hence have a lower density than the panel proper, being therefore somewhat softer and more flexible. As shown in FIG. 4, the thickness of the package tray measured through the pads 30 from the top surface of the panel to the bottoms of the pads is substantially greater than the thickness of the panel itself.

The panel tray 19 is self-supporting and sufficiently rigid to support the weight of various objects including speakers, a third tail light, and the like, and the bumps or pads 30 are relatively soft and compressible by comparison. Accordingly, these bumps or pads 30 may contact the body structure of the vehicle repeatedly when the vehicle is in motion, but due to their greater softness, they will prevent the tray from rattling even though it may vibrate.

The dimensions of the pads 30 may vary, but have a maximum diameter usually of about 6 to 10 mm, desirably 7 to 9 mm and preferably about 8 mm. The maximum height or thickness of the pads is usually about 1 to 3 mm, desirably about 1 to 2 mm and preferably about 1.5 mm. The compression resistance of the pads 30 may also vary, but for a compression of 1 mm is a force usually about 1 to 3.5 lbs, desirably about 1.5 to 2.5 lbs and preferably about 2.0 lbs. The thickness of the panel (excluding the bumps) varies considerably depending on the particular application and the strength and sound deadening properties required. Such panel thickness is usually about 3 to 40 mm, desirably 3 to 15 mm and preferably 3 to 10 mm.

What is claimed is:

1. A package tray adapted to be mounted on the body structure of an automotive vehicle, comprising a relatively rigid, substantially self-supporting panel, said panel having a plurality of spaced apart, integral, button-like pads projecting downwardly from the bottom surface thereof for engagement with said body structure of the vehicle to preclude objectionable rattling of said panel, said panel and pads being molded from a single blank of fibrous material, said pads within the perimeters thereof being completely and integrally joined to said panel at said bottom surface, said pads being softer than said panel, and said pads projecting sufficiently beneath said panel to maintain said panel in spaced relation to and free of contact with said body structure of the vehicle at least in the region of said panel where said pads are located.

2. A package tray as defined in claim 1, wherein said pads are part-spherical.

3. A package tray as defined in claim 2, wherein said pads are arranged in a plurality of laterally spaced apart rows with a plurality of spaced apart pads in each of said rows.

4. A package tray as defined in claim 1 wherein the pads have a maximum diameter of about 6 to 10 mm, a maximum height of about 1 to 3 mm, and a compression resistance of about 1 to 3.5 pounds for an initial compression of 1 mm.

* * * * *